(12) United States Patent
Araki et al.

(10) Patent No.: US 8,402,735 B2
(45) Date of Patent: *Mar. 26, 2013

(54) COOLING APPARATUS, GAS TURBINE SYSTEM USING COOLING APPARATUS, HEAT PUMP SYSTEM USING COOLING SYSTEM, COOLING METHOD, AND METHOD FOR OPERATING COOLING APPARATUS

(75) Inventors: Hidefumi Araki, Hitachi (JP); Takanori Shibata, Hitachinaka (JP); Shigeo Hatamiya, Hitachi (JP); Moriaki Tsukamoto, Tokai (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/555,888

(22) Filed: Jul. 23, 2012

(65) Prior Publication Data

US 2012/0282080 A1    Nov. 8, 2012

Related U.S. Application Data

(63) Continuation of application No. 11/767,805, filed on Jun. 25, 2007, now Pat. No. 8,240,122.

(30) Foreign Application Priority Data

Jun. 26, 2006    (JP) ................................. 2006-174723

(51) Int. Cl.
*F02C 9/00* (2006.01)

(52) U.S. Cl. .................. 60/39.3; 60/39.53; 60/39.59

(58) Field of Classification Search ............... 60/39.3, 60/39.53, 39.59, 728, 775, 806; 415/175, 415/176

See application file for complete search history.

(56) References Cited

U.S. PATENT DOCUMENTS

| 2,407,165 A | 6/1941 | Kreitner et al. |
| 2,372,846 A | 8/1942 | Nettel et al. |
| 2,784,571 A | 2/1954 | Schelp |
| 4,051,888 A | 10/1977 | Yamada et al. |
| 4,261,169 A * | 4/1981 | Zimmern ........................ 60/775 |
| 7,204,077 B2 * | 4/2007 | Tanaka et al. ................. 60/39.41 |
| 7,712,301 B1 | 5/2010 | Wagner |
| 2001/0027642 A1 | 10/2001 | Tsuji |
| 2001/0039794 A1 | 11/2001 | Rocklin et al. |
| 2005/0066664 A1 | 3/2005 | Shibata et al. |
| 2005/0193714 A1 * | 9/2005 | Walsh et al. ................. 60/39.53 |
| 2007/0000267 A1 | 1/2007 | Shibata et al. |
| 2009/0038287 A1 | 2/2009 | Sasaki et al. |

FOREIGN PATENT DOCUMENTS

| JP | 55-160265 | 12/1980 |
| JP | 57-86600 A | 5/1982 |
| JP | 3-128281 | 12/1991 |
| JP | 3-279683 A | 12/1991 |
| JP | 2004-300928 A | 10/2004 |
| JP | 2005-105908 A | 4/2005 |
| JP | 2005-274070 A | 10/2005 |
| JP | 2007-10243 A | 1/2007 |

* cited by examiner

*Primary Examiner* — Phutthiwat Wongwian
(74) *Attorney, Agent, or Firm* — Mattingly & Malur, PC

(57) ABSTRACT

The amount of water to be injected in an intercooler is controlled to cool the compressed gas to the saturation temperature. It is difficult to adjust the amount of the water to be injected, however, since the temperature of the compressed gas at an intercooler outlet is actually higher than the saturation temperature. An intercooling system is configured so as to cool a gas to the saturation temperature without controlling the amount of water injection and thereby maintain the reliability of the compressor while improving the cooling efficiency. The intercooling system is located between a plurality of compression stages of a gas compressor to cool the gas that has been in the compressor. A desired amount of liquid is sprinkled to cool the compressed gas while restraining inflow of the liquid into the compression stages.

4 Claims, 10 Drawing Sheets

COOLING APPARATUS, GAS TURBINE SYSTEM USING COOLING APPARATUS, HEAT PUMP SYSTEM USING COOLING SYSTEM, COOLING METHOD, AND METHOD FOR OPERATING COOLING APPARATUS

BACKGROUND OF THE INVENTION

1. Field of the Invention

The present invention relates to a cooling apparatus adapted to cool compressed fluid from a gas compressor which compresses air, steam, etc., a gas turbine system using a cooling apparatus, a heat pump system using a cooling apparatus, a cooling method, and a method for operating a cooling apparatus.

2. Description of the Related Art

Intercooling of a gas compressor which compresses air and steam is performed by a known system which cools a gas that has been compressed in a compressor by water injection. In connection with a method of cooling hot fluid like a gas compressed in a compression process of a compressor, JP-A-2005-274070 discloses an apparatus which injects desuperheated water into superheated steam to desuperheat the steam close to a saturation temperature.

In accordance with a system which cools the compressed gas to about the saturation temperature through water injection in an intercooler of the compressor, it is necessary to restrain erosion caused by excessive water injection or a decrease in the cooling efficiency due to insufficient water injection. Therefore, conventionally when cooling the compressed gas close to the saturation temperature by water injection into the intercooler, it is essential to control the amount of water injection based on the steam temperature at the intercooler outlet, etc.

SUMMARY OF THE INVENTION

When controlling the amount of water distribution in a water-spray intercooler, it is necessary to take into consideration a measurement error of a measurement value which is a reference of control as well as a time difference from the start of measurement to completion of adjustment of the amount of water distribution. Since it is necessary to set a margin in consideration of the above, there is a limit in the accuracy for properly adjusting the amount of water injection through control. Therefore, even if the amount of water injection has been controlled so as to cool the compressed gas to the saturation temperature, the temperature of the compressed gas at the intercooler outlet is actually higher than the saturation temperature and accordingly the efficiency of the compressor decreases for this higher temperature. It is an object of the present invention to provide a cooling apparatus which can accomplish the improvement in the efficiency of the compressor.

To accomplish the above-mentioned object, there is provided a cooling apparatus as an intercooling system according to the present invention, which is located between a plurality of compression stages of a gas compressor to cool a gas compressed in the above-mentioned compressor, the apparatus comprising means for cooling the abovementioned compressed gas by sprinkling a desired amount or more of liquid while restraining inflow of the liquid into the above-mentioned compression stages.

In accordance with the present invention, it is possible to provide a cooling apparatus which can accomplish the improvement in the efficiency of a compressor.

Figure 1:
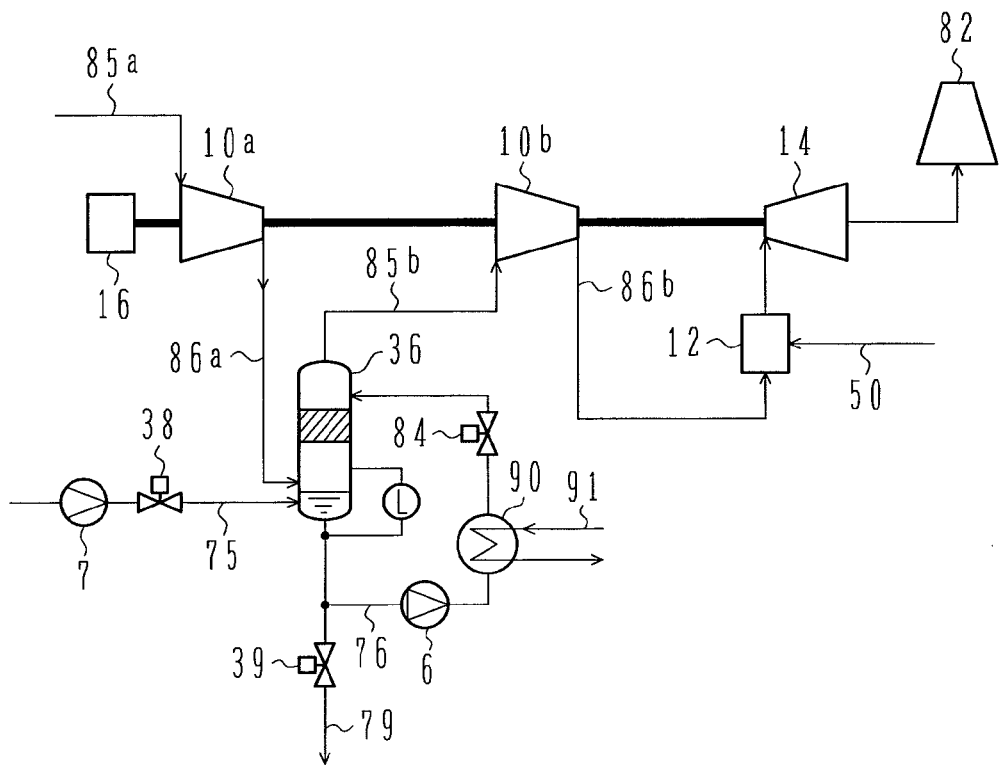
FIG. 1 is a circuit diagram showing a simple-cycle gas turbine system which applies an intercooling system according to a first embodiment of the present invention.

| Description of Numerals | |
|---|---|
| 5 | Makeup water pump |
| 6, 6a, 6b, 6c | Circulating pump |
| 7 | Feed pump |
| 10a, 10b, 110, 110a, 110b, 110c, 110d | Compressor |
| 12 | Combustor |
| 14 | Turbine |
| 16 | Dynamo |
| 25, 86, 86a, 86b, 186, 186a, 186b, 186c, 186d | Discharge pipe |
| 31 | Makeup water |
| 35 | Liquid water |
| 36, 36a, 36b, 36c, 136, 136a, 136b, 136c, 136d | Cooling tower |
| 38, 39, 83, 84 | Regulating valve |
| 40 | Warm water |
| 42 | Evaporator |
| 50 | Fuel |
| 60 | Recuperator |
| 61 | Outlet pipe |
| 70 | Gas distributor |
| 71 | Packing |
| 72 | Demister |
| 74 | Liquid pool |

-continued

| Description of Numerals | |
|---|---|
| 75, 76, 79 | Pipe |
| 78 | Water gauge |
| 80 | Liquid distributor |
| 82 | Stack |
| 85, 85a, 85b, 185, 185a, 185b, 185c, 185d | Inlet pipe |
| 90 | Heat exchanger |
| 91 | Cooling water |
| 92 | Perforated plate |
| 93 | Spray nozzle |

DETAILED DESCRIPTION OF PREFERRED EMBODIMENTS

A technique used for improving the compression efficiency of a compressor will be explained below. With a gas compressor, intercooling of a compressed gas is performed to increase the density of the gas to reduce the power necessary for compression, thus improving the compression efficiency. Furthermore, water is sprinkled into the gas sucked in the compressor to cool the compressed gas, and the sprinkled water is evaporated by the heat of the compressed gas and an effect of temperature rise within the compressor, thus increasing the flow rate of the compressed gas, which is a mainstream fluid of the compressor, while reducing the compression power.

If water is sprinkled to the compressed gas within an intercooler of a compressor, the flow rate of the compressed gas can be increased while reducing the compression power of the compressor. Increasing the flow rate of the gas in the intercooler means that more amount of gas has been compressed by the same compression power, resulting in improved compression efficiency.

As explained above, if water is sprinkled in the intercooler of the compressor, the compression efficiency of the compressor is improved thanks to two different effects: one is an effect of cooling the compressed gas and the other is an effect of increased amount of the compressed gas through evaporation of sprinkled water. In this case, the compression efficiency is maximized when the gas is cooled to the saturation temperature. Therefore, in order to improve the compression efficiency, it is desirable to sprinkle such a large amount of water that can cool the compressed gas to the saturation temperature.

However, if too much water has been sprinkled in the intercooler, some sprinkled water which has not evaporated in the intercooler flows into the compressor and droplets strike against the compression stage which is rotating at high speed. This causes mechanical corrosion called erosion resulting in degraded reliability of the compressor.

In order to maximize the compression efficiency without degrading the reliability of the compressor, it is desirable to control the amount of water distribution so that water is sprinkled as much as possible within a limit of amount of water that can evaporate in the intercooler.

As a method of determining an appropriate amount of water distribution, it is possible to use the temperature of the compressed gas, for example, at the intercooler outlet as a reference. The mainstream pressure of the compressor is an approximately constant value and, if the pressure is constant, the saturation temperature at the relevant pressure will be accordingly determined. If the temperature of the compressed gas at the intercooler outlet is set up to 5 to 10° C. higher than the saturation temperature, the compressed gas is superheated at the intercooler outlet and therefore there is little possibility that the sprinkled water has not evaporated and flows into the compressor as a liquid.

In accordance with the present embodiment, the temperature of the compressed gas is set up to 5 to 10° C. higher than the saturation temperature because it is necessary to take a margin in consideration of a measurement error of gas temperature as well as a time difference from the start of measurement to completion of adjustment of the amount of water distribution. It is necessary to take this margin so that the temperature of the compressed gas becomes high. If the temperature of the compressed gas becomes lower than the saturation temperature at the intercooler outlet, the compressed gas here has been saturated and therefore part of the sprinkled water has not completely evaporated or remains liquid, resulting in degraded reliability of the compressor.

A technique based on a measurement value other than the temperature at the intercooler outlet can also be considered. However, in order to maintain the reliability of the compressor, it is necessary to set up a margin so that the temperature of the compressed gas becomes high. Therefore, it is difficult to cool the compressed gas to the saturation temperature with a method of controlling the amount of water distribution.

The above-mentioned method of controlling the amount of water distribution premises that all the amount of water sprinkled in the intercooler will evaporate unless the compressed gas has been saturated. Since a lot of water that has not completely evaporated remains in an intercooler that does not satisfy this prerequisite, it is necessary to increase the above-mentioned margin setting, resulting in insufficient effect of cooling the compressed gas.

In order to efficiently perform heat exchange between the compressed gas and the sprinkled water so that this prerequisite be satisfied, it is desirable to increase a contact area of the compressed gas and sprinkled water. Although the above can be accomplished possibly by increasing the length of a gas-liquid contact path in the intercooler, making droplets of sprinkled water finer, or taking other measures. In either case, however, there is an increase in the size and complexity of the apparatus, resulting in high system cost.

On the other hand, an intercooler of embodiments of the present invention is not based on control of the amount of water distribution but configured so that the compressed gas be cooled down to the saturation temperature while structurally restraining the degradation of the reliability of the compressor.

Specifically, the intercooler is provided with means for restraining inflow of sprinkled water into the compressor, and configured so that the compressed gas be cooled with a desired amount or more of water distribution. Here, the desired amount of water means such an amount of water that can cool the temperature of the compressed gas at the intercooler outlet to the saturation temperature.

As means for restraining inflow of sprinkled water into the compressor, for example, there is a method of configuring a path so that the compressed gas be circulated from the lower to the upper part in the intercooler, installing a water distributor between the inlet and the outlet for a compressed gas, and installing a demister which is a liquid passage restrainer between the water distributor and the outlet for a compressed gas. If the intercooler is thus configured, most part of water that has not completely evaporated or remains liquid flows down because of the gravity effect, and there is little possibility that the water flows into the compressor from the outlet for a compressed gas. Although it can be considered that some fine droplets flow upward in the path along with the flow of a compressed gas, these fine droplets are caught by the demister located immediately before the path outlet to restrain inflow into the compressor, thereby restraining the degradation of the reliability.

Thus-configured apparatus makes it possible to cool the compressed gas to the saturation temperature without degrading the reliability of the compressor. Specifically, the use of an intercooler according to embodiments of the present invention makes it possible to immediately cool the air to be compressed because margin setup is not necessary in comparison with the case of controlling the amount of water distribution, allowing further improvement in the compression efficiency. This can be attributed to a configuration which theoretically makes it possible not only to restrain the degradation of the reliability of the compressor but also to cool the compressed gas to the saturation temperature by using the gravity and installing a demister to restrain inflow of liquid water into the compressor as well as by sprinkling a desired amount or more of water.

A cooling apparatus of the present invention will be explained in detail below with reference to embodiments.

First Embodiment

Figure 3:
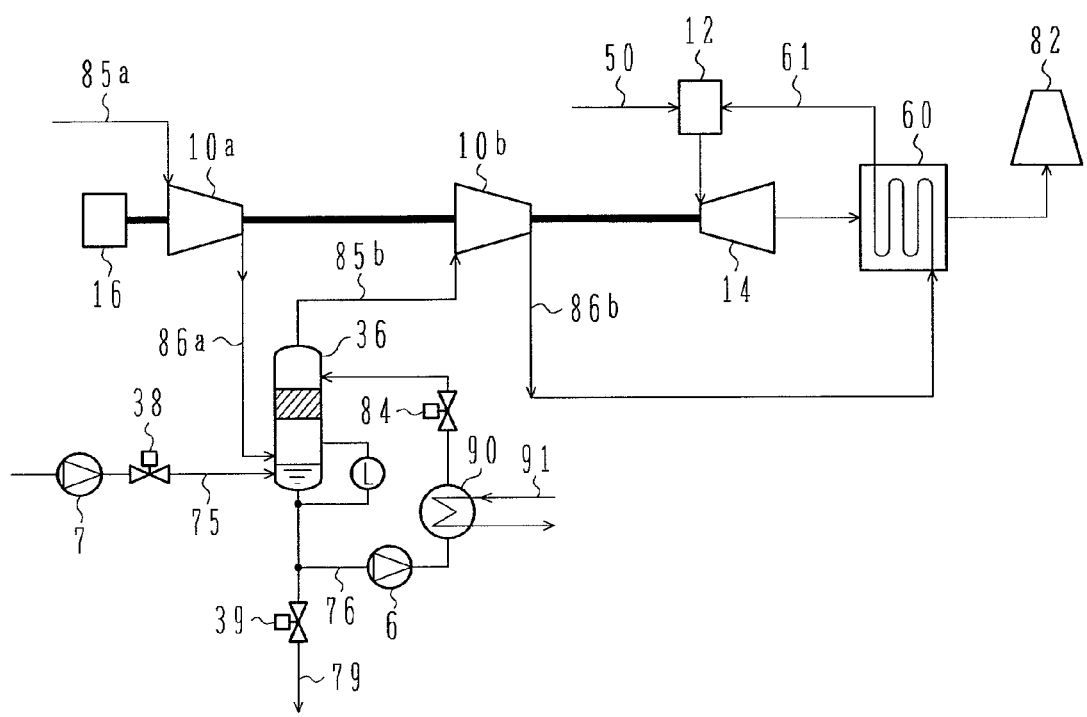
FIG. 3 is a circuit diagram showing a recuperated-cycle gas turbine system having the intercooling system of compressor according to the first embodiment of the present invention.

A first embodiment of the present invention will be explained in detail below with reference to FIG. 3. FIG. 3 illustrates a recuperated-cycle gas turbine system having an intercooling system of a compressor according to an embodiment of the present invention.

The recuperated-cycle gas turbine system according to the present embodiment mainly includes compressors 10a and 10b which compress air, a recuperator 60 which heats compressed air obtained by compressing air with the compressor 10b using exhaust gas of a gas turbine, a combustor 12 which combusts air heated by the recuperator 60 and fuel 50 to generate combustion gas, a turbine 14 which is driven by the above-mentioned combustion gas generated by the combustor 12, and a stack 82 which discharges combustion gas as exhaust gas, the combustion gas being produced by driving the turbine 14 and performing heat exchange with compressed air by the recuperator 60. The present embodiment assumes that the pressure ratio of the gas turbine is 16, the pressure ratio of the compressors 10a and 10b is respectively 4, and the inlet flow rate of the gas turbine is 10 kg/s. Furthermore, the present embodiment assumes that the temperature efficiency of the recuperator is 90% and the polytropic efficiency of the compressors and the turbine is 88%. The motive energy obtained from an output shaft of the gas turbine is transformed into electric power by a dynamo 16 and then connected to the transmission grid.

A characteristic component according to the present embodiment is the cooling tower 36 which is an intercooling system provided to a discharge pipe 86 of the compressor 10a. The cooling tower 36 will be explained in detail below with reference to FIG. 2.

Figure 2:
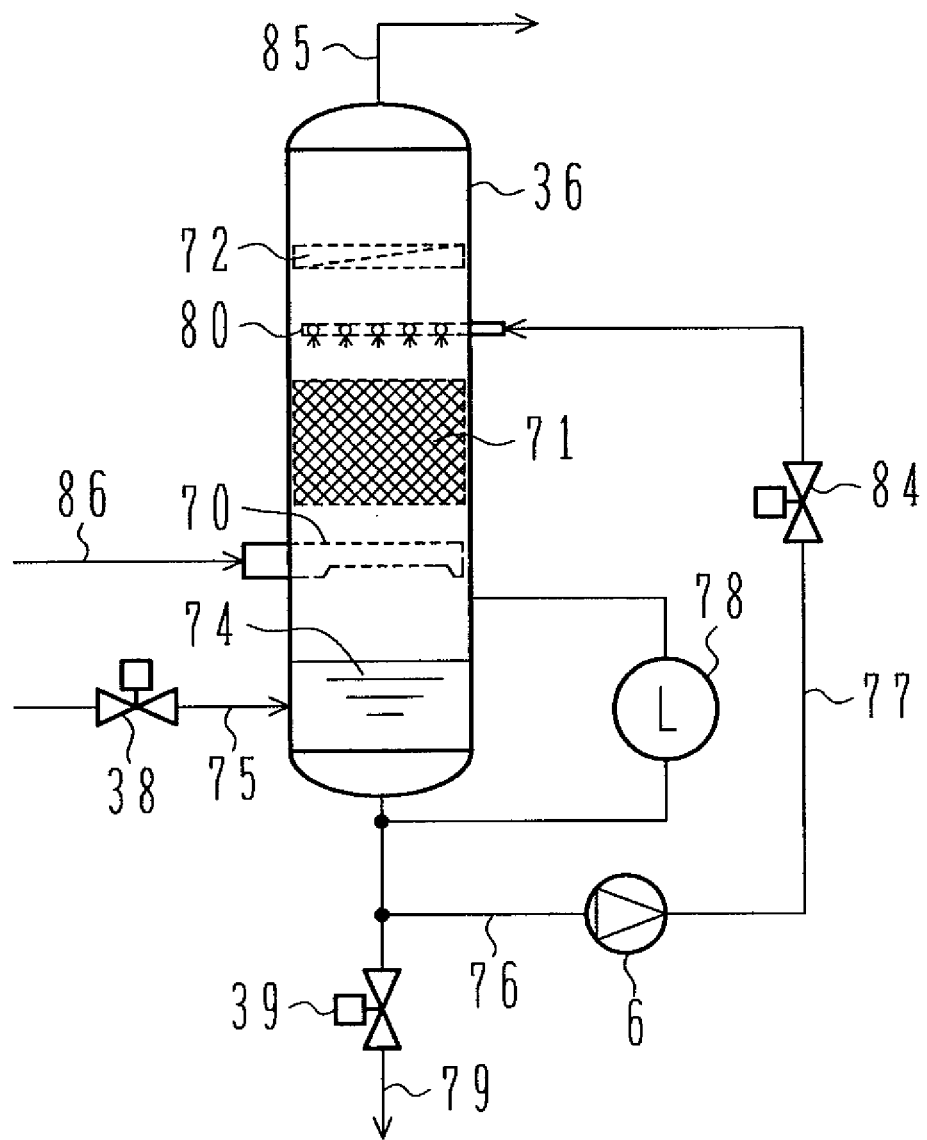
FIG. 2 is a detailed diagram showing a cooling tower 36 according to the first embodiment of the present invention.

FIG. 2 is a detailed diagram showing the cooling tower 36. A cooling tower 36a shown in FIG. 2 is provided to a circulating pump 6 which recirculates circulating water dropped to the bottom of the tower to an upper part of packing 71 in the tower. Furthermore, makeup water can be supplied to a reservoir 74 by a feed pump 7 and a regulating valve 38. A gas distributor 70 which compressed air enters is provided to distribute the compressed air led from the compressor 10a through a discharge pipe 86a so that the air may not concentrate at a certain portion in the cooling tower 36a. This gas distributor 70 is provided with a downward opening in order to avoid inflow of droplets dropping from above. The cooling tower 36 shown in FIG. 2 is a packed tower using the packing 71. The packing 71 is provided in order to increase the effective area of gas-liquid contact above the gas distributor 70. As the packing 71, a structure having a large surface area per unit volume is used, which is generally used in chemical plants for example. In accordance with the present embodiment, random packing commercially available is used as the packing 71. A cooling tower 36a having a tower diameter of 1.8 m is applied based on flooding characteristics generally disclosed as performance specifications of the packing 71. Flooding refers to a phenomenon in which, when the flow velocity of gas increases in a packed tower or perforated plate tower for letting a liquid film flow down against an upward gas flow, sprinkled water cannot flow downward because of upward force exerted from the gas flow. The embodiment applies the packing 71 with a packing height of 0.8 m assuming that, when water with a temperature of about 35° C. is sprinkled, the air temperature at the outlet of the cooling tower 36a becomes around 60° C. A demister 72 which is a liquid passage restrainer for restraining inflow of liquid into the compressor removes droplets, such as entrainment produced by shearing force between upward air flow on the surface of the packing 71 and downward liquid film flow, to restrain inflow of droplets into the compressor 10b located downstream. For this reason, it is desirable to locate the demister 72 above the packing 71 and the liquid distributor 80. The circulating pump 6 sucks in liquidus water from the reservoir 74 at the bottom of the cooling tower 36a through a pipe 76.

In accordance with the present embodiment, a heat exchanger 90 performs heat exchange between discharge water of the circulating pump 6 and low-temperature cooling water 91. The circulating water cooled by the heat exchanger 90, after the flow rate thereof is adjusted by a regulating valve 84, is supplied through the liquid distributor 80 located above the packing to the cooling tower 36a. The liquid distributor 80, generally used in chemical plants, etc., is provided with a function for distributing liquidus water as evenly as possible to the entire area of the packing. In order to control the water level of the reservoir 74 for a desired position, a water gauge 78 is provided to the cooling tower 36a. If the water level of the reservoir 74 drops, the regulating valve 38 on a pipe 75 is operated to supply makeup water from a water source. If the water level of the reservoir 74 rises, a regulating valve 39 on a pipe 79 is operated to discharge liquidus water out of the system.

Steady-state operation of the recuperated-cycle gas turbine power generation system including the intercooling system according to the present embodiment will be explained below with reference to FIG. 3.

After air is sucked in by an inlet duct (not shown), soot and dust are removed by an inlet air filter (not shown) and then the air is compressed up to about 400 kPa by the compressor 10a. The compressed air flows into the cooling tower 36. In the cooling tower 36, water with a temperature of about 35° C. having almost the same mass flow rate, which has been cooled by the heat exchanger 90, is sprinkled to the surface of the packing 71. Under atmospheric conditions with 15° C. air temperature and 60% relative humidity, a dew-point temperature of the compressed air at the inlet of the cooling tower 36 is about 29° C. The compressed air is cooled while being humidified through gas-liquid contact with water at temperature higher than the dew-point temperature.

Figure 5A:
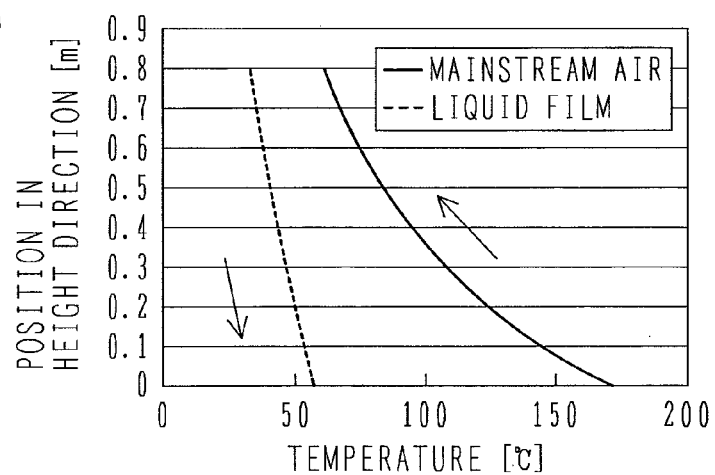
FIGS. 5A to 5C are graphs respectively showing distributions of temperature, absolute humidity, and amount of humidification in terms of heights at a location of packing 71 in the cooling tower 36 according to the first embodiment of the present invention.
Figure 5B:
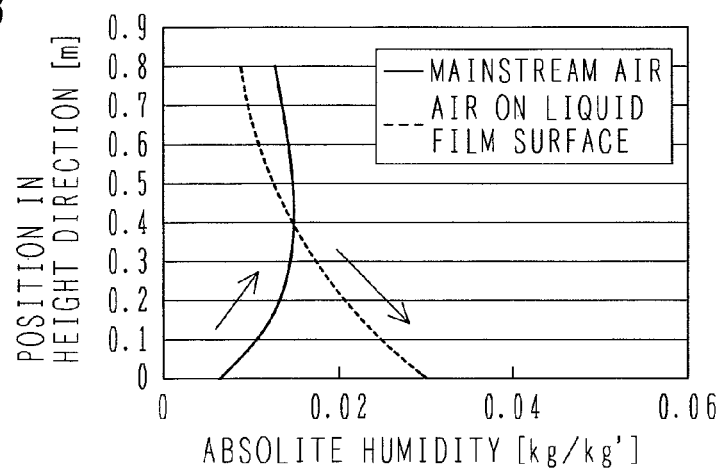
Figure 5C:
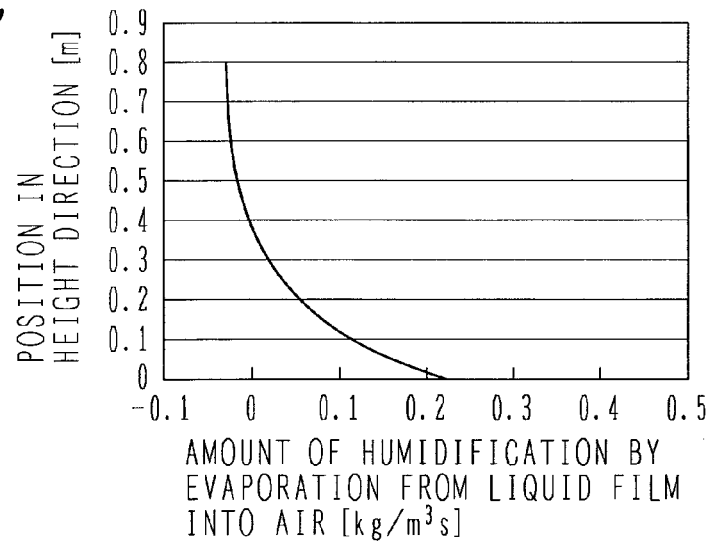

FIGS. 5A to 5C are graphs respectively showing distributions of temperature, absolute humidity, and amount of humidification in terms of heightwise positions at the location of packing 71 in the cooling tower 36 of the present embodiment. As shown in FIG. 5A, air (indicated with a solid line) with a temperature of about 174° C. which entered the lower part of the cooling tower 36 is cooled as it flows upward, while performing heat exchange with a liquid film (dotted line) with a temperature of about 35° C. flowing down on the surface of the packing 71 from the upper part. A gas-liquid interface between the liquid film and the air is covered by humid air having saturated steam pressure corresponding to the temperature of the liquid film. As shown in FIG. 5B, the absolute humidity (indicated with a dotted line) of humid air on the liquid film surface is higher than the absolute humidity (solid line) of the mainstream humid air at the lower part of the packing 71. Therefore, as shown in FIG. 5C, steam transfers into the mainstream air from the liquid film surface because a difference in the steam pressure acts as motive force. As a result, the absolute humidity of the mainstream air rises as it flows upward. At the upper part of the packing 71, however, this relationship is interchanged because of low temperature of liquid film water; as a result, the absolute humidity of the mainstream air rises and accordingly moisture in the mainstream air condenses and transfers toward the liquid film. Like the present embodiment, when low-temperature water with a temperature of about 35° C. is contacted with compressed air with a temperature of about 174° C., the amount of humidification from the low-temperature water to the compressed air is comparatively small, i.e., about 0.6% by mass of air. On the other hand, the air temperature at the outlet of the cooling tower is cooled down to about 62° C., which means that the mainstream air has been cooled by more than 100° C. in the cooling tower 36. Liquid film water dropped from the packing 71 flows down into the reservoir 74 in the cooling tower 36. Moisture lost by evaporation is replenished into the reservoir 74 through the feed pump 7 and the regulating valve 38. Hot water with a temperature of about 55° C. is supplied from the reservoir 74 to the heat exchanger 90 by the circulating pump 6. In the heat exchanger 90, hot water with a temperature of about 55° C. is cooled down to about 35° C. through heat exchange with the low-temperature cooling water 91 and then supplied again to the cooling tower 36.

The compressed air cooled down to about 62° C. by the cooling tower 36 is sucked in through an inlet pipe 85b to the compressor 10b and then compressed to 1600 kPa. The temperature at this time becomes about 240° C. In accordance with the present embodiment, since the inlet air temperature and discharge temperature of the compressor 10b are comparatively low (about 62° C. and about 240° C., respectively), the compression power can remarkably be reduced in comparison with a case when these temperatures are high.

Table 1 indicates comparison of compression power between a case when an intercooling system is prepared and a case when it is not, with a virtual compressor having a pressure ratio of 16 consisting of two compressors having a pressure ratio of 4 connected in series, shown in the present embodiment. It is clear that, when the mainstream air has been cooled down to about 62° C. by the intercooling system, the compression power can be reduced by about 17%.

TABLE 1

| Intercooling system | Required compression power [kW] (With an inlet flow rate of 10 kg/s) | | |
| --- | --- | --- | --- |
| | Compressor 10a | Compressor 10b | Total |
| Without cooling tower | 1600 | 2500 | 4100 |
| With cooling tower (up to about 62° C.) | 1600 | 1900 | 3500 |

The compressed air with a temperature of about 240° C. in a discharge pipe 86b flows into a heated fluid path of the recuperator 60, and performs heat exchange with exhaust gas with a temperature of about 560° C. in the turbine 14 to be heated to about 530° C. This compressed air is supplied through a heated fluid outlet pipe 61 of the recuperator 60 to the combustor 12, and is combusted with fuel 50 to become combustion gas with a temperature of about 1300° C. Since the compressed air to be supplied to the combustor 12 has been heated by the recuperator 60, it is possible to remarkably save the flow rate of the fuel 50 required at this time in comparison with a case when the recuperator 60 is not used, resulting in improved plant thermal efficiency. When high-temperature combustion gas has been supplied to the turbine 14 and passed a vane and a bucket (not shown), the heat energy is transformed into rotational kinetic energy through expansion process. The rotational kinetic energy drives the dynamo 16 connected to the same shaft as the turbine and then electrical energy is taken out. Combustion exhaust gas with a temperature of about 560° C. discharged from the turbine 14 through expansion process is supplied to an exhaust gas path of the recuperator 60, and then used to heat the compressed air as mentioned above. Furthermore, combustion exhaust gas with a temperature of about 340° C. discharged from the recuperator 60 is led to the stack 82, and then released to the atmosphere.

In accordance with the present embodiment, liquid water before distribution in the cooling tower 36 is cooled by the heat exchanger 90. Thus-configured system makes it possible to improve the cooling efficiency of the mainstream air in the cooling tower. Since this heat exchanger 90 performs heat exchange between liquids, the overall thermal conductivity thereof is larger than that of a heat exchanger which performs heat exchange between gas and liquid, providing an advantage that the heat exchanger can be configured compactly. Furthermore, since the temperature of water flowing in the heat exchanger 90 is about 55° C. at maximum, high corrosion resistance is not required. Therefore, a comparatively inexpensive heat exchanger, such as a plate type heat exchanger, can be used as the heat exchanger 90.

The present embodiment utilizes the liquid water of the reservoir 74 as sprinkling water from the liquid distributor 80 by circulating the liquid water of the reservoir 74 using the circulating pump 6. Of the sprinkled water, water that has not completely evaporated or remains liquid after heat exchange with the mainstream air flows down into the reservoir 74. With the above-mentioned configuration in which part of the liquid water sprinkled to cool the mainstream air can be redistributed, the amount of water supplied from external can be reduced aiming at effective use of water.

A pressure vessel, the packing 71, etc. of the cooling tower 36 are mass-production products which are comparatively inexpensive and generally used in chemical plants. Furthermore, of circulating water circulating from the cooling tower 36 through the heat exchanger 90, part of the liquid film surface evaporates. Impurities are condensed to circulating water. In order to restrain water quality deterioration of the reservoir 74 caused by the condensing of impurities contained in makeup water, it is desirable to operate the regulating valve 39 to discharge part of the liquidus water continuously or intermittently out of the system.

FIG. 1 shows a simple-cycle gas turbine which applies the intercooling system according to the present embodiment. So far, an example which applies an intercooling system to the recuperated-cycle gas turbine has been explained with reference to FIG. 3. However, as shown in FIG. 1, it may be possible to apply the intercooling system according to the present embodiment to a simple-cycle gas turbine. Application of the intercooling system to a simple-cycle or recuperated-cycle gas turbine is advantageous in that the compression power can be reduced as mentioned above. Furthermore, by cooling compressed air, this case also provides an effect of preventing components of compressor from being heated to high temperature to prolong the operating life. When using bleed air from compressor to cool hot components of the turbine, the temperature of cooling air used to cool components of the turbine can be decreased by performing intercooling of the compressor, thus saving the amount of cooling air.

The recuperated-cycle gas turbine, since the discharge temperature of the compressor 10b also decreases because of intercooling effect, can provide an effect of increasing the amount of exhaust heat which can be recovered from exhaust gas by the recuperator 60. Specifically, in terms of the power generation efficiency, a case when the intercooling system according to the present embodiment is applied to the recuperated-cycle gas turbine shown in FIG. 3 can obtain higher effect than a case when it is applied to a simple-cycle gas turbine.

Figure 7:
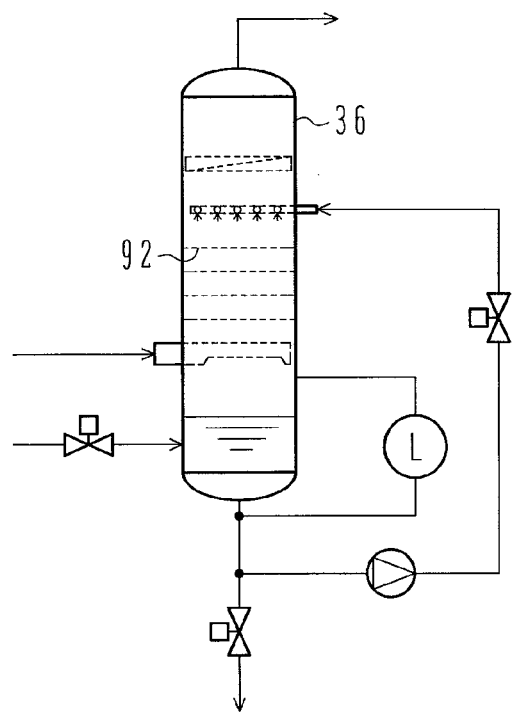
FIG. 7 is a detailed diagram showing the cooling tower 36 of the present invention.

FIG. 7 is a detailed diagram showing the cooling tower 36. The cooling tower 36b shown in FIG. 7 is a perforated plate tower using a perforated plate 92 instead of the packing 71 used in the cooling tower 36a shown in FIG. 2. The use of the perforated plate 92 for the cooling tower 36 is characterized by favorable geometric flow rate distribution of the gas and liquid in the tower and higher immunity to contamination in comparison with a packed tower. The packed tower is more advantageous than the perforated plate tower in higher contact efficiency per unit volume and lower pressure loss.

Figure 8:
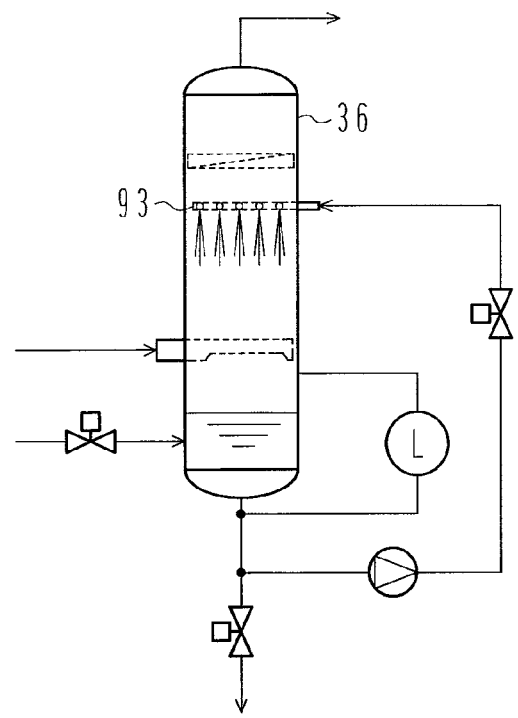
FIG. 8 is a detailed diagram showing the cooling tower 36 of the present invention.

FIG. 8 is a detailed diagram showing the cooling tower 36. The cooling tower 36c shown in FIG. 8 is a spray tower in which large volume of droplets are sprinkled (or sprayed) from a spray nozzle 93 instead of installing the packing 71 in the cooling tower 36a shown in FIG. 2. The spray tower is more advantageous than the packed tower and the perforated plate tower in lower pressure loss.

In particular with the spray tower in which heat exchange between droplets and mainstream air is performed in space, it is desirable to sprinkle droplets larger than predetermined size. The predetermined size means such a size with which water has not completely evaporate for each droplet, i.e., some droplets have not completely evaporated or remain liquid and flow down into the reservoir 74.

Here, when considering a case where fine droplets with a diameter of about 10 μm to 20 μm are sprayed, for example, so that they completely evaporate in the cooling tower 36c, separation of impurities from droplets is restrained and therefore it is desirable that pure water from which impurities have been removed to an infinitesimal level be used as spraying water. If impurities are separated in the space in the cooling tower 36c, impurities may adhere to the inner wall of the cooling tower 36c, etc., or micro impurities may be led by and accompany the mainstream air in the compressor, which may cause damage to the compressor. For this reason, the spray tower shown in FIG. 8 is configured so that large volume of comparatively large droplets with a diameter of 100 μm or more can be sprinkled from the spray nozzle 93 and only part of the surface of droplets sprinkled evaporate. Droplets that have not evaporated or remain liquid flow down into the reservoir, are recirculated by a pump, and then reused for sprinkling from the spray nozzle 93. With thus-configured system, impurities in water do not evaporate and remain in droplets in the spray tower shown in FIG. 8. Therefore, it is possible to restrain adhesion of impurities to the inner wall of the cooling tower and inflow thereof into the compressor, even without preparing pure water from which impurities have been removed to an infinitesimal level, which can suppress the degradation of the cooling efficiency of the cooling tower and the degradation of the reliability of the compressor.

When a packed tower or a perforated plate tower is used as a cooling tower, most part of droplets adhering to the packing 71, the perforated plate 92, and other structures performs heat exchange with the mainstream air. Therefore, there is little possibility that impurities adhere to the inner wall of the cooling tower or flow into the compressor. Even in this case, however, if the configuration is such that droplets larger than predetermined size are sprinkled, it is possible not only to further improve the reliability of the compressor but also to suppress adhesion of impurities to the packing 71, the perforated plate 92, the demister 72, and other structures. Accordingly, it is possible to suppress the increase in the pressure loss of the mainstream air and the degradation of the cooling efficiency, even without preparing pure water from which impurities have been removed to an infinitesimal level.

In accordance with the present embodiment, a packed tower which is the cooling tower 36a shown in FIG. 2 is used as an intercooling system of the compressor, it may be possible to use the perforated plate tower shown in FIG. 7 or the spray tower shown in FIG. 8 instead of the packed tower. What is necessary is to increase the contact area of the mainstream air and droplets. By increasing the gas-liquid contact area, the efficiency of heat exchange can be improved and efficient evaporation of droplets promoted, resulting in reduced size and cost of the cooling tower 36. The cooling efficiency of the cooling tower 36 can further be improved.

A method of operating the cooling tower 36 performed at the time of activation of the gas turbine system according to the present embodiment will be explained below with reference to FIG. 3. Before activating the compressors 10a and 10b, water is injected into the cooling tower 36 up to a predetermined water level using the feed pump 7. Here, the predetermined water level refers to a design water level uniquely determined for each system, i.e., a water level that can secure such an amount of water that does not cause shortage of circulating water at least during operation of the cooling tower. Then, the water in the reservoir 74 in the cooling tower 36 is supplied to the heat exchanger 90 by means of the circulating pump 6. The water that has been heat-exchanged with the low-temperature cooling water 91 by the heat exchanger 90 is supplied to the liquid distributor 80 of the cooling tower 36 through the regulating valve 84. The water sprinkled on the surface of the packing 71 from the liquid distributor 80 flows down into the reservoir 74, is sucked in by the circulating pump 6, and then is circulated through the same path.

Under this condition, the compressors 10a and 10b are driven by a drive unit (not shown). When the compressors have been driven, the dew-point temperature of air rises as the pressure rises in the compressors. While the temperature of components of the compressor 10a is low, moisture in the air condenses to produce condensate water. This condensate water is caught by the demister 72 in the cooling tower 36 and then flows down into the reservoir 74. If there is large amount of condensate water, the water level of the reservoir 74 rises and therefore the regulating valve 39 on the pipe 79 is automatically controlled to discharge excessive water out of the system. If components of the compressor 10a are warmed and the discharge air temperature of the compressor 10a has become steady with time, the downstream path of the inlet pipe 85 of the compressor 10b also reaches steady state through operation of the cooling tower 36.

Thus, it is desirable to start water distribution to the packing 71 of the cooling tower 36 before starting air compression in order to prevent the following two problems: firstly, if the compressors are activated before starting water distribution to the cooling tower 36, the inlet temperature, pressure, and flow rate of the compressor 10b rapidly fluctuate; and a surge region is entered in which the flow rate and pressure ratio of the compressor 10b unstably vibrate, degrading the reliability of the compressor 10b. Since the compressor 10b is connected in series with the compressor 10a on the same shaft, the compressor 10a is also affected by the pressure ratio or flow rate, similarly resulting in degraded reliability. Secondly, if the compressor is driven without water distribution to the cooling tower 36, the internal temperature of the cooling tower 36 is increased to about 174° C. and accordingly the temperatures of the devices and pipes also become high. If water is sprinkled in the cooling tower 36 with such high temperature, the pressure may rapidly rise because of the bumping phenomenon of the liquidus water which is in contact with hot components.

Specifically, by starting water distribution to the cooling tower 36 before starting air compression, it is possible to avoid rapid change of the temperature, pressure, and flow rate in the path of the compressor 10, making it possible to restrain the degradation of the reliability of the compressor 10 and the cooling tower 36. Furthermore, in accordance with the present embodiment, the demister 72 is installed in the cooling tower 36 and therefore there is little possibility that drain flows into the compressors even if water distribution is started before activating the compressors. Therefore, even if water distribution is started before activating the compressors, it is not necessary to prepare means for suppressing erosion.

On the other hand, in connection with the operation method of the cooling tower 36 when the gas turbine system according to the present embodiment is in a stop, it is desirable to stop the compressors 10a and 10b before stopping water distribution to the cooling tower 36. If water distribution to the cooling tower 36 is stopped during operation of the compressors, the discharge temperature, pressure, and flow rate may change rapidly in each of the compressor 10a and 10b, possibly causing surge of compressor and bumping phenomenon of sprinkling water. By stopping the compressors 10a and 10b before stopping water distribution to the cooling tower 36 as mentioned above, it is possible to avoid rapid change of the temperature and pressure of the compressed fluid during operation of the compressor 10a and 10b, making it possible to restrain the degradation of the reliability of the compressor 10 and the cooling tower 36.

Second Embodiment

Figure 4:
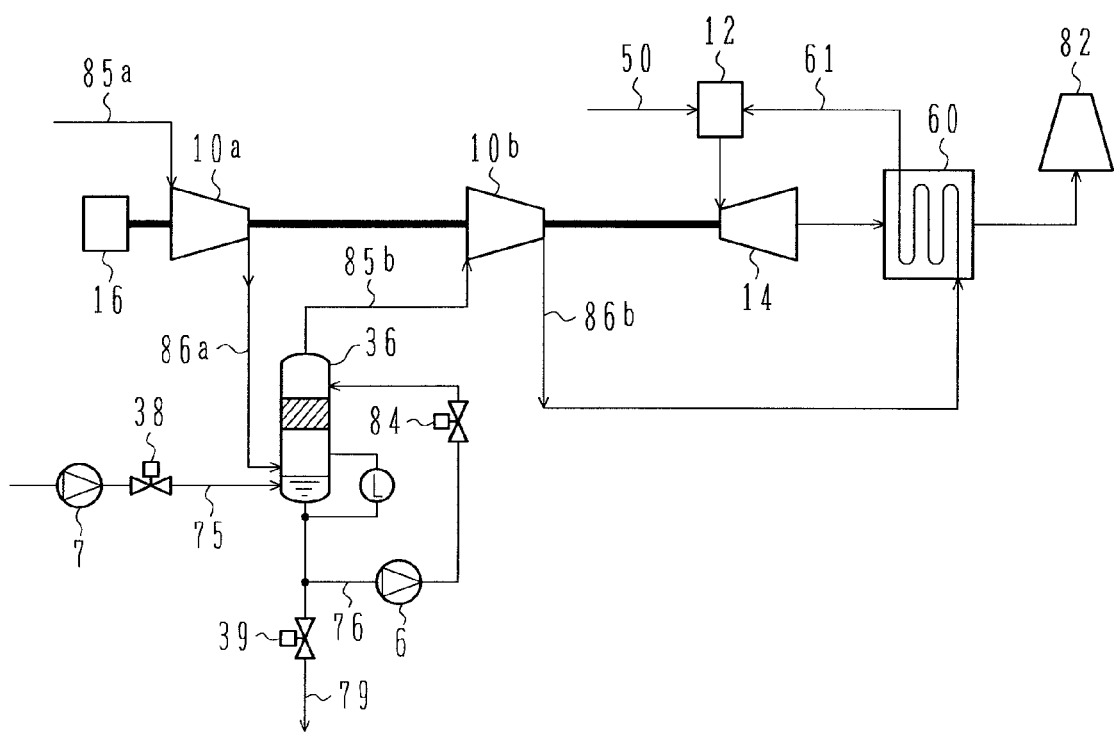
FIG. 4 is a circuit diagram showing a recuperated-cycle gas turbine system having an intercooling system of compressor according to a second embodiment of the present invention.

Another embodiment of a recuperated-cycle gas turbine system having an intercooling system according to the present invention will be explained below with reference to FIG. 4. FIG. 4 shows a recuperated-cycle gas turbine system having an intercooling system of compressor according to an embodiment of the present invention. The recuperated-cycle gas turbine system having the intercooling system shown in the first embodiment provides an effect of cooling compressed air by 100° C. or more and the amount of humidification for the compressed air is 0.6% by mass of air. The present embodiment indicates a recuperated-cycle gas turbine system having an intercooling system which provides a smaller effect of cooling compressed air and accordingly a larger effect of humidifying compressed air than the system shown in the first embodiment. The system shown in the present embodiment differs from the system shown in the first embodiment in that neither the heat exchanger 90 nor the cooling water 91 is used. After the flow rate has been adjusted by means of the regulating valve 84 without cooling, the discharge water of the circulating pump 6 is supplied to the liquid distributor 80 located above the packing.

Steady-state operation of the intercooling system according to the present embodiment will be explained below with reference to FIG. 4. By using the compressor 10a, air compressed to about 400 kPa flows through the discharge pipe 86a into the cooling tower 36. In the cooling tower 36, hot water with a temperature of about 65° C. supplied from the circulating pump 6 is sprinkled on the surface of the packing. Under atmospheric conditions with 15° C. air temperature and 60% relative humidity, the dew-point temperature of the compressed air at the inlet of the cooling tower 36 is about 29° C. In the cooling tower 36, the compressed air is humidified through gas-liquid contact with hot water with a temperature higher than the dew-point temperature.

Figure 6A:
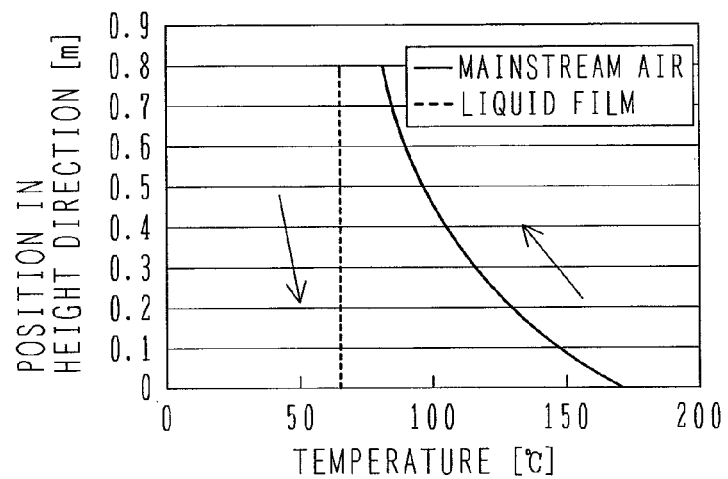
FIGS. 6A to 6C are graphs respectively showing distributions of temperature, absolute humidity, and amount of humidification in terms of heights at a location of packing 71 in the cooling tower 36 according to the second embodiment of the present invention.
Figure 6B:
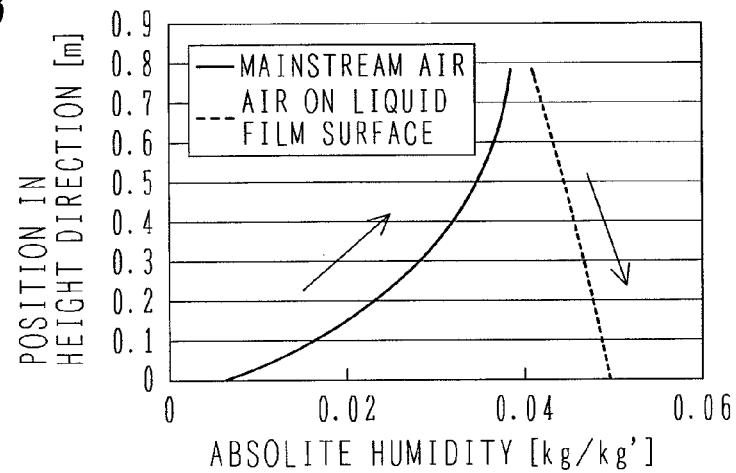
Figure 6C:
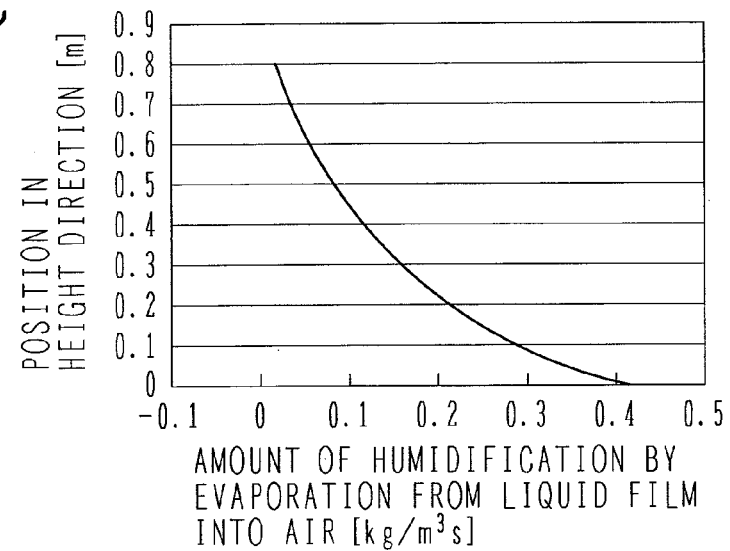

FIGS. 6A to 6C show graphs of distributions of temperature, absolute humidity, and amount of humidification in terms of height positions at the location of packing 71 in the cooling tower 36 of the present embodiment. FIGS. 6A, 6B, and 6C indicate temperature, absolute humidity, and amount of humidification, respectively. As shown in FIG. 6A, air (solid line) with a temperature of about 174° C. which entered the cooling tower 36 from the bottom thereof is cooled as it flows upward, while performing heat exchange with a liquid film (dotted line) with a temperature of about 65° C. flowing down on the surface of the packing 71 from the upper part. As shown in FIG. 6B, the absolute humidity (dotted line) of humid air on the liquid film surface is higher than the absolute humidity (solid line) of the mainstream air in the entire area of the location of packing 71. Therefore, as shown in FIG. 6C, steam transfers into the mainstream air from the liquid film surface because a difference in the steam pressure acts as motive force. As a result, the absolute humidity in the mainstream air monotonically increases as it flows upward. In accordance with the first embodiment, since water with a temperature of about 35° C. is sprinkled, the absolute humidity of the mainstream air and that of the air on the liquid film surface are interchanged at the upper part of the packing. In accordance with the present embodiment, however, they are not interchanged. In accordance with the present embodiment in which hot water with a temperature of about 65° C. is contacted with compressed water with a temperature of about 174° C., the amount of humidification for air is 3.2% by mass of air. On the other hand, the air temperature at the outlet of the cooling tower is 82° C. Specifically, the air is cooled down to about 90° C. in the cooling tower 36. Liquid film water dropped from the packing flows down into the reservoir 74 in the cooling tower 36. Moisture lost in evaporation is replenished through the feed pump 7 and the regulating valve 38, and is supplied from the circulating pump 6 to the heat exchanger 90 as hot water with a temperature of about 65° C.

The system shown in the present embodiment differs from the first embodiment in that there is comparatively large volume of makeup water in the cooling tower 36, i.e., the amount of evaporation is about 3.2% by mass of air for the present embodiment or about 0.6% by mass of air for the first embodiment. An increase in the amount of evaporation by about 3.2% by mass of air flow rate means that the compressor 10a has compressed humid air with a mass flow rate of 103.2% at compression work required for a mass flow rate of 100%, i.e., the compression power per unit mass flow rate has been reduced.

Compressed air cooled down to about 82° C. by the cooling tower 36, with an increase in the mass flow rate by 3.2%, is sucked in by the compressor 10b through the inlet pipe 85b and then compressed to about 1600 kPa. The temperature at this time is about 260° C. In accordance with the present embodiment, since the inlet air temperature and discharge temperature of the compressor 10b are comparatively low (about 82° C. and about 260° C., respectively), the compression power can remarkably be reduced in comparison with a case when these temperatures are high. Other operations and functions are the same as those of the first embodiment.

When circulating water of the cooling tower 36 is not cooled down as is the case with the present embodiment, large part of intercooling of the compressed air is based on evaporation latent heat of sprinkling water in comparison with the first embodiment in which circulating water is cooled, a cooling range of air is apt to be limited by the dew-point temperature of humid air which goes up with humidification. On the other hand, since the heat exchanger 90 used in the first embodiment is not required, system cost can be reduced. Furthermore, the more amount of moisture is added to air for combustion, the more amount of nitrogen oxide generated can be restrained at the time of combustion.

Activation and deactivation methods of the cooling tower 36 according to the present embodiment is almost the same as those of the first embodiment, only with a difference in that the heat exchanger 90 located downstream of the circulating water pump 6 is not activated.

Third Embodiment

Figure 9:
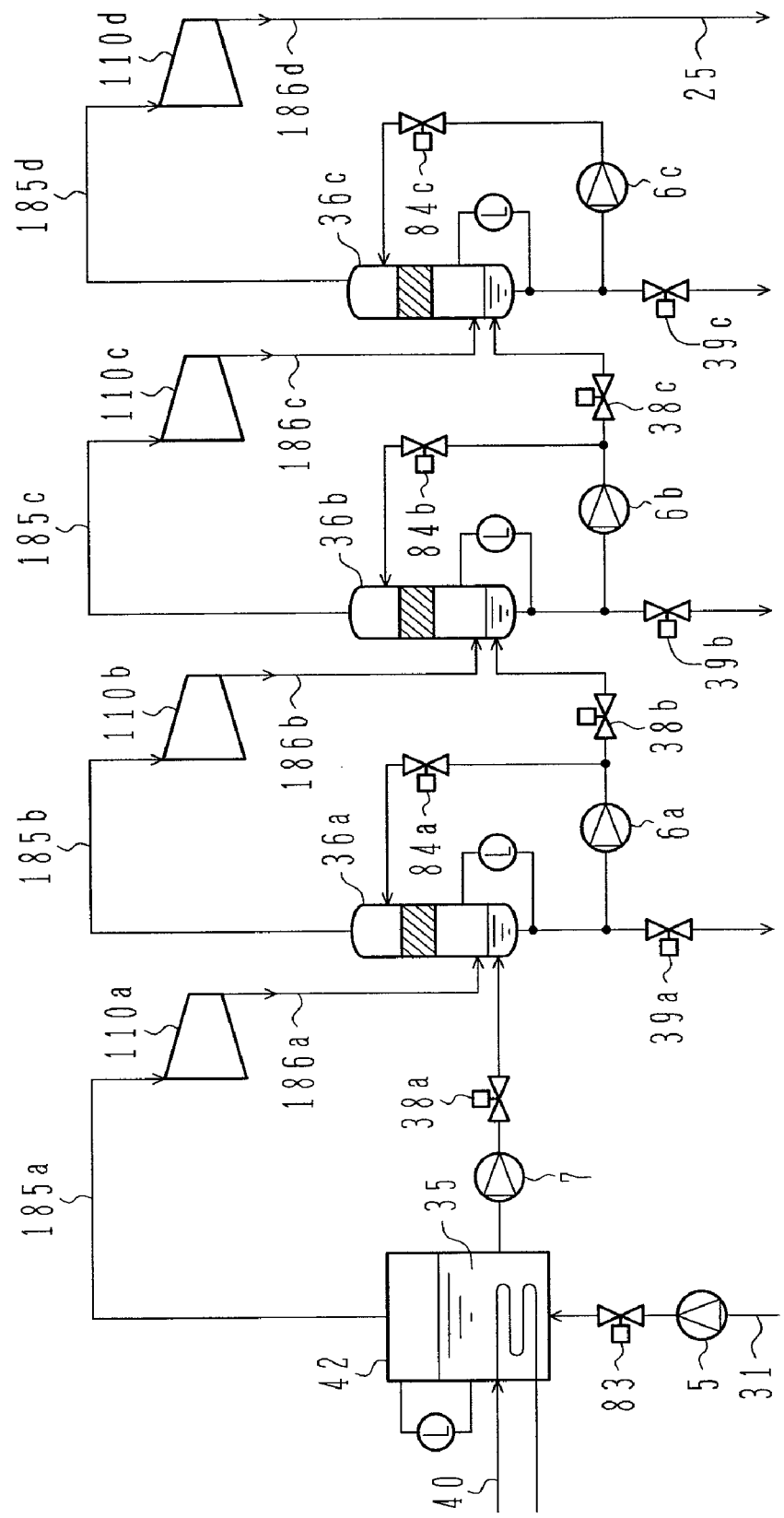
FIG. 9 is a diagram showing a steam heat pump system having an intercooling system of compressor according to a third embodiment of the present invention.

Still another embodiment of the present invention will be explained below with reference to FIG. 9. FIG. 9 shows a steam heat pump system having an intercooling system of compressor according to a third embodiment of the present invention. The present embodiment differs from the first and second embodiments in that the fluid which flows in the compressors is steam instead of air.

The present embodiment mainly includes an evaporator 42 which evaporates liquid water 35 with the heat of warm water 40 introduced from outside under conditions below the atmospheric pressure to generate steam; compressors 110a, 110b, 110c, and 110d driven by a drive unit (not shown), which pressurize the steam generated by the evaporator 42; and a discharge pipe 25 which supplies the hot steam pressurized by the above-mentioned compressor 110d to a target location. Compressors 110a, 110b, 110c, and 110d are connected in series on the same shaft and configured to gradually raise the steam pressure. Furthermore, characteristic components of the present embodiment includes a cooling tower 136a connected to a discharge pipe 186a of the compressor 110a, a cooling tower 136b connected to a discharge pipe 186b of the compressor 110b, and a cooling tower 136c connected to a discharge pipe 186c of the compressor 110c. These cooling towers 136a, 136b, and 136c are respectively provided with circulating pumps 6a, 6b, and 6c which recirculate circulating water, dropped to the bottom of the tower, to the upper part above packing 71. Furthermore, required amount of makeup water 31 can be supplied to an evaporator 42 by means of a makeup water pump 5 and a regulating valve 83. Liquid water 35 of the evaporator 42 can be supplied to the cooling tower 136a by means of a feed pump 7 and a regulating valve 38a. Furthermore, discharge pipes of circulating pumps 6a and 6b of the cooling towers 136a and 136b are respectively connected to the cooling towers 136b and 136c so as to supply discharge water. These pipes are respectively provided with regulating valves 38b and 38c. Structure and function of the cooling towers 136a, 136b, and 136c are almost the same as those of the cooling tower 36 of the first embodiment. However, if the internal pressure of the cooling tower 36 is lower than the pressure outside the system like the present embodiment, a pressurizing pump (not shown) is located on a pipe 79 to discharge liquidus water by making the pressure thereof higher than the pressure outside the system.

Steady-state operation method of the heat pump system according to the present embodiment will be explained below.

Warm water 40 warmed to about 70° C. by an external heat source is supplied to the evaporator 42. An example of external heat source used is exhaust heat from a factory, a garbage incineration plant, a thermal power station, a combustion engine, etc. The liquid water 35 of the above-mentioned evaporator 42 is retained at about 63° C. through indirect heat exchange with the warm water 40. The liquid water is retained at about 63° C., for example, by controlling the supply flow rate and temperature of the warm water 40. The surface of the liquid water 35 retained at about 63° C. will be in gas-liquid equilibrium between 63° C. steam with a saturated steam pressure of about 23 kPa and liquidus water with a temperature of about 63° C. The air at the upper space in the evaporator 42 has been discharged and the space is filled with steam having an absolute pressure of about 23 kPa. When the compressor 110a is driven under this condition, steam with a volume according to the inlet capacity of the compressor 110a is absorbed through an inlet pipe 185a. With this absorption, the liquid water 35 continuously evaporates from the surface thereof to generate steam, depriving large volume of evaporation latent heat from the liquid water 35. This deprived heat is covered through heat exchange with the warm water 40.

The steam with a temperature of about 63° C. and a pressure of about 23 kPa which has been absorbed by the compressor 110a is pressurized by the compressor 110a up to about 48 kPa to become superheated steam with a temperature of about 145° C. This superheated steam with a temperature of about 145° C. flows into the cooling tower 136a through a gas distributor 70 in the cooling tower 136a and is subject to gas-liquid contact with the liquid film of hot water at temperature lower than about 80° C. or the saturation temperature sprinkled from the liquid distributor 80, on the surface of the packing 71.

Figure 10A:
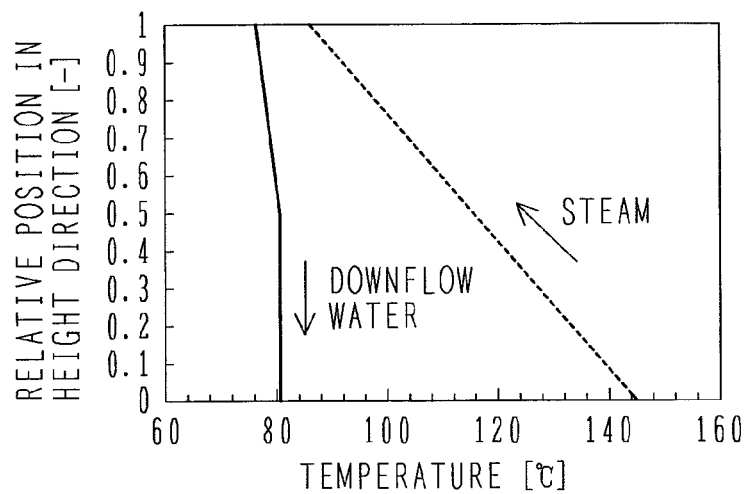
FIGS. 10A to 10C are graphs respectively showing distributions of temperature, flow rate, and steam pressure in terms of heights at a location of packing 71 in the cooling tower 36 according to the third embodiment of the present invention.
Figure 10B:
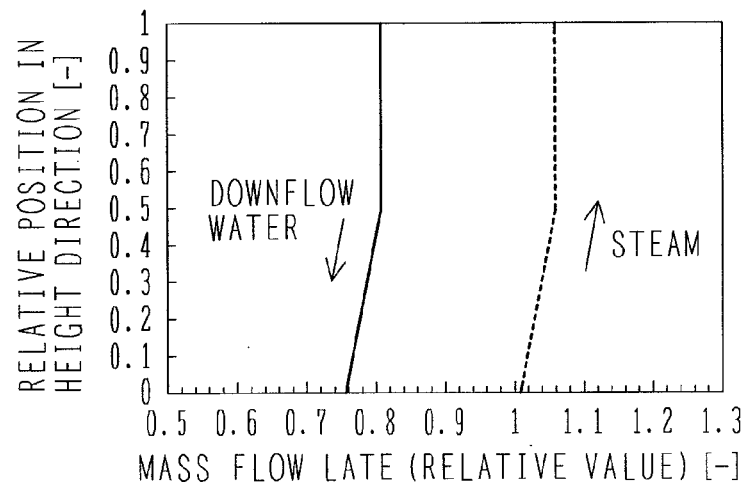
Figure 10C:
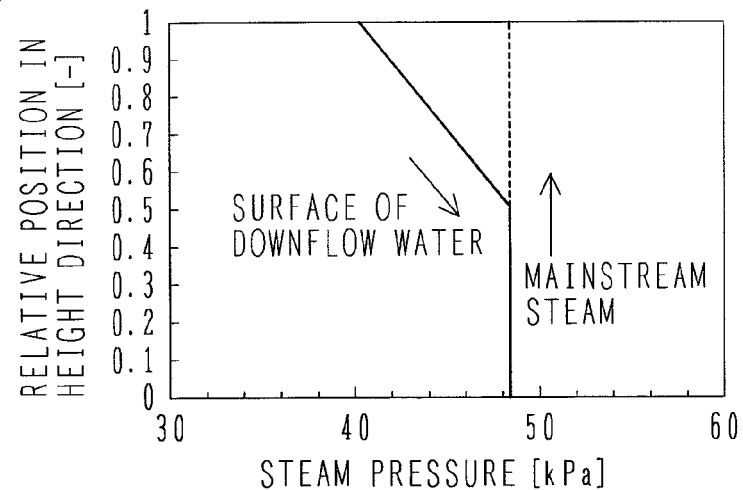

FIGS. 10A to 10C shows graphs of distributions of temperature, flow rate, and steam pressure in terms of height positions at the location of packing 71 in the cooling tower 36 of the present embodiment. FIGS. 10A, 10B, and 10C indicate temperature, flow rate, and steam pressure, respectively.

The sprinkled hot water flows down to the surface of the packing 71 while forming a liquid film. At the upper part of the packing, hot water is heated through heat transmission based on the temperature difference from the hot superheated steam, becoming hotter as it flows downward, as shown in FIG. 10A. The upper limit temperature to which the hot water is heated is about 80° C. or the saturation temperature for the internal pressure of the tower. At the lower part of the packing, hot water is heated through heat transmission based on the temperature difference by the superheated steam with a temperature of about 145° C., and accordingly hot water with a temperature of about 80° C. flowing down on the surface of the packing is heated. This heat quantity is used not for temperature rise of hot water since the saturation temperature in the tower is about 80° C. but as latent heat with which hot water evaporates. Then, as shown in FIG. 10B, part of the hot water becomes steam. With this effect, the mass flow rate of the steam increases by about 5 percent after it has passed the packing. On the other hand, sensible heat is deprived from the superheated steam by the hot water and the temperature decreases as the superheated steam flows upward, as shown in FIG. 10A. When hot water evaporates from the liquid film surface, the evaporating water is pure steam which contains no impurities. If solid matters, metal ions, oxides, or other impurities are contained in makeup water, they remain in the liquid film water and condense. Therefore, even if impurities are contained in the makeup water, the steam added to the mainstream steam in the cooling tower 136 contains no impurities, and accordingly compressors and devices located downstream of the cooling tower 136 are not affected. The use of the cooling tower 36 of the present embodiment makes it possible to suppress the degradation of the reliability of compressors and gauges, even without using makeup water from which impurities have been removed to an infinitesimal level.

The temperature of the sprinkled water which ran down from the packing becomes about 80° C. or the saturation temperature. Then, the sprinkled water drops into the reservoir 74 in the cooling tower 136a for collection. Since the amount of water which flows down decreases by evaporation as shown in FIG. 10B, the water level is measured with a water gauge 78, the regulating valve 38 is automatically controlled, and makeup water is supplied from the pipe 75 to maintain the amount of water of the reservoir 74. Through mixing with low-temperature water, the water temperature of the reservoir 74 becomes lower than about 80° C. or the saturation temperature by several degrees.

With this effect, the temperature of the superheated steam decreases to about 80° C. or the saturation temperature in the cooling tower 136, resulting in a slight increase in the flow rate. As change of energy, the energy of sensible heat of the superheated steam has been transformed into energy of latent heat, resulting in decreased temperature of the steam and increased flow rate. Since the compressor 110a requires only the power for compressing the steam of the flow rate before increase, steam of more amount of mass flow rate has been compressed with less compression power.

Fine mist called entrainment is generated from the liquid film surface by a shearing force between the liquid film flowing down on the surface of the packing 71 and the steam flowing upward. The steam and fine mist which flow upward in the path of the packing 71 pass the packing 71 and then flow into the demister 72 at the upper part. The demister 72 eliminates most of mist, and dry steam at the saturation temperature coming out of the cooling tower 36a flows into the compressor 10b through a pipe 73. The purpose of eliminating mist is to prevent droplets from hitting the rotational section of the compressor and prevent mechanical corrosion called erosion from occurring. When mist caught by the demister gathers together and has become large droplets, they drop by the gravity and then flow down on the packing surface as sprinkling water.

Furthermore, by performing intercooling through operation of the cooling tower 136, the compressor 110b of the present embodiment compresses steam with a temperature lower than that of steam compressed without intercooling. Therefore, when compressing steam with the same pressure ratio, it can be compressed with less power. Discharge steam of the compressor 110b of the present embodiment is superheated steam having a pressure of about 95 kPa and a temperature of about 158° C. In order to reduce the compression power when compressing this superheated steam by means of the compressor 110c, the superheated steam is cooled by the cooling tower 136b nearly to the saturation temperature with the same operation as that explained for the cooling tower 136a and then adjusted to steam with slightly increased mass flow rate. Also when compressing steam with the compressor 110d, the superheated steam is cooled down nearly to the saturation temperature by the cooling tower 136c to increase the mass flow rate. As a result, the steam temperature at the inlet of the compressor 110d becomes about 117° C. and the pressure becomes about 179 kPa; and the steam temperature at the outlet of the compressor 110d becomes about 187° C.

and the pressure becomes about 312 kPa. This superheating steam is supplied to a heat application facility through the discharge pipe 25.

In accordance with the present embodiment, the compressors 110b, 110c, and 110d can compress steam with more amount of mass flow rate with less compression power through operation of the cooling towers 136a, 136b, and 136c, respectively. Since each compressor compresses saturated steam at temperature lower than that of the superheated steam, compression can be performed with less power. As the entire system, more amount of steam can be compressed with less power and the cooling efficiency increases synergistically.

Figure 11A:
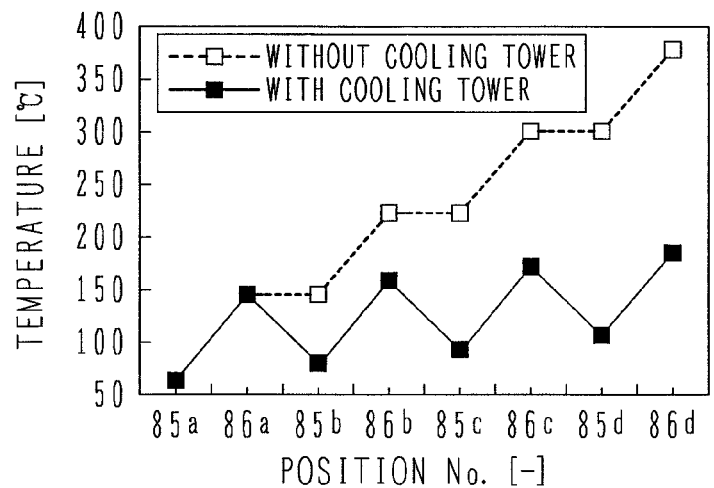
FIGS. 11A to 11C are graphs respectively showing transitions of temperature, pressure, and mass flow rate in the case where the cooling tower according to the third embodiment of the present invention is operated and in the case where it is not operated.
Figure 11B:
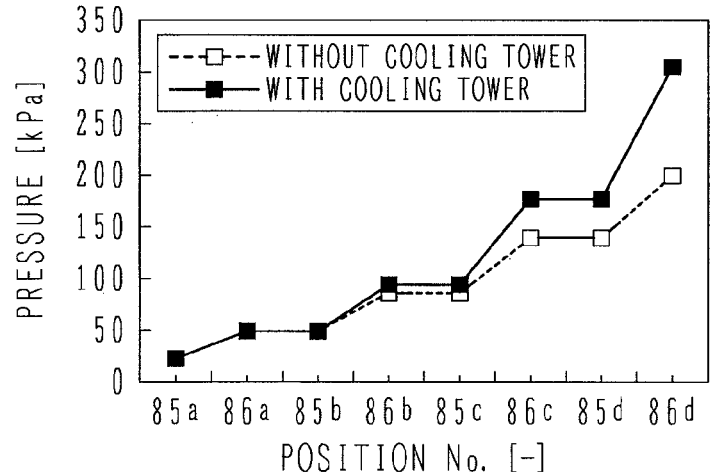
Figure 11C:
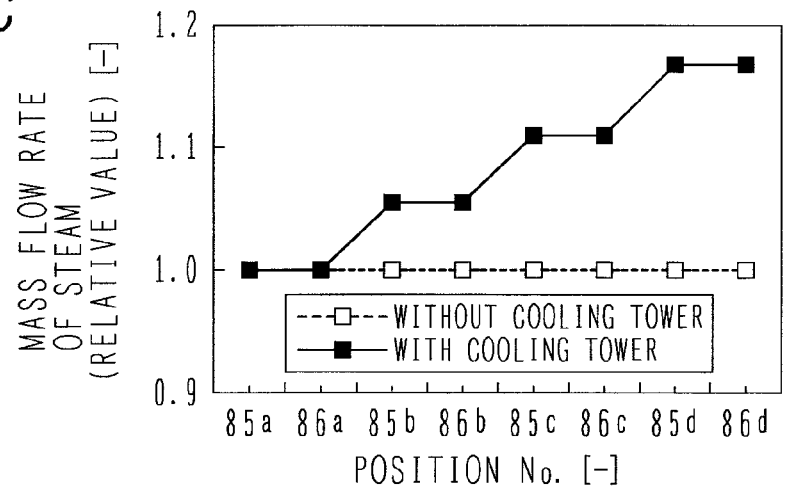

An effect of the present embodiment will quantitatively be explained below with reference to FIGS. 11A to 11C. FIGS. 11A to 11C shows transitions of temperature, pressure, and mass flow rate in two cases when the cooling tower 136 of the present embodiment is operated and when it is not operated. FIGS. 11A, 11B, and 11C indicate temperature, pressure, and mass flow rate, respectively.

The temperature of a discharge pipe 186d of the compressor 110d is about 187° C. as shown by the solid line of FIG. 11A in the case where the cooling tower is operated or about 370° C. as shown by the dotted line in the case where the cooling tower is not operated. When the same compressor is used, therefore, the discharge pressure is about 312 kPa in the former case and about 206 kPa in the latter case. For general industrial application of steam, since steam is normally used as saturated steam, the utility value of steam largely differs for pressure of about 312 kPa and about 206 kPa. Furthermore, in accordance with the present embodiment, it is possible to obtain an effect of increasing the amount of steam which is working medium. When the cooling tower 136 is operated, the amount of steam increases 1.17 times; otherwise, the amount of increase is zero.

In order to prevent impurities contained in makeup water from condensing to degrade the water quality in the reservoir 74, it is desirable to operate the regulating valve 39 to continuously or intermittently discharge part of liquidus water out of the system like the above-mentioned first and second embodiments.

Furthermore, in accordance with the present embodiment, although a water source at as close temperature as possible was planned to be used as a source of makeup water for the reservoir 74 in the cooling towers 136a, 136b, and 136c, it may be possible to directly supply water from the low-temperature makeup water 31 to respective cooling tower. Also in this case, basic operations are almost the same. However, since the temperature of distribution water from each liquid distributor 80 decreases, sensible heat deprived from the superheated steam increases and accordingly the amount of steam generated decreases, but an effect of cooling the mainstream steam increases.

In accordance with the present embodiment as mentioned above, it becomes possible to provide a compact low-cost intercooling system, not requiring pure water from which impurities have been removed to an infinitesimal level, in the steam compressor 110. This makes it possible to improve the overall system efficiency because thermal energy contained in the superheated steam can be transformed into mass energy of steam at the time of intercooling.

Although the present embodiment assumes a mechanical pump as the circulating pump 6 and the feed pump 7, it is also possible to configure a steam jet pump using higher-pressure steam of the discharge pipe 25 and the discharge pipe 186. In this case, it is possible to simplify devices and, in comparison with a mechanical pump, decrease the possibility of leak of fluid from the shaft seal part and mixing of impurities from outside.

A method of activating the steam heat pump system according to the present embodiment will be explained below. Before activating the compressors 110a, 110b, 110c, and 110d, water is injected into the cooling towers 136a, 136b, and 136c up to a predetermined water level. When water injection is completed, regulating valves 84a, 84b, and 84c are opened to sprinkle water to the packing 71 of the cooling towers 136a, 136b, and 136c, and circulate water in the cooling towers by means of circulating pumps 6a, 6b, and 6c, respectively.

In this condition, the compressors 110a, 110b, 110c, and 110d are driven to gradually discharge air present in the inlet pipe 185, the discharge pipe 186, and the cooling tower 136 through the discharge pipe 25 and an exhaust gas stack (not shown) into atmosphere, based on fluid drive effect of the compressors. In this case, it may be possible to discharge air using a vacuum pump (not shown) instead of driving the compressors 110a, 110b, 110c, and 110d. If the system is designed so that air is discharged by the compressor 110, the vacuum pump for air discharge is not necessary. On the other hand, if the system is designed so that air is discharged by a vacuum pump 8 for air discharge, it is possible to design the compressor 110 dedicated for low-pressure steam and apply a compressor which exhibits high performance at the time of steady-state operation. When making the compressor 110 discharge air, it is necessary to design the flow rate and pressure ratio characteristics of the compressor so that an unstable phenomenon, such as surge, may not occur not only when compressing steam but also when compressing air.

After air has been discharged, the upper space of the evaporator 42 will be filled with steam having an absolute pressure of about 23 kPa. Furthermore, in the cooling towers 136a, 136b, and 136c, when the compressors 110a, 110b, 110c, and 110d have been driven, the temperature and pressure will reach the steady state and activation completes. In the course of temperature rise, the heat of steam is used to increase the temperature of the cooling tower 136, the inlet pipe 185, and the discharge pipe 186 which were low temperature at the time of activation, and part of the steam condenses. This condensate water is caught by the demister 72 in the cooling tower 136, and flows down into the reservoir 74. If there is large amount of condensation of steam at the time of activation, the water level of the reservoir 74 rises and therefore the regulating valve 39 of the pipe 79 is automatically controlled to discharge the liquidus water out of the system.

As explained above, it is desirable to start water distribution to the packing 71 of the cooling tower 136 before starting steam compression, in order to prevent the following two problems from arising: Firstly, if the compressors are activated before starting water distribution to the cooling tower, the discharge temperature, pressure, and flow rate of each of the compressor 110a, 110b, 110c, and 110d rapidly fluctuate; and a surge region may be entered in which the flow rate and pressure ratio of the compressors unstably vibrate, degrading the reliability of the compressors. Secondly, if the compressors are driven without water distribution to the cooling tower, the steam temperature of the cooling tower 36c located most downstream reaches about 300° C. resulting in high-temperature devices and pipes. If water distribution is started to the cooling tower 136 in such a high-temperature condition, the bumping phenomenon of liquidus water in contact with hot components may arise resulting in a rapid pressure increase. Like the present embodiment, by starting water distribution to the cooling tower 136 before starting steam compression, it is possible to avoid rapid change of the temperature, pressure, and flow rate in the steam path, enabling highly reliable operation.

On the other hand, when stopping the steam heat pump system according to the present embodiment, it is desirable to perform operation in reverse order of activation, i.e., to stop the compressors before stopping water distribution to the cooling tower 136. If water distribution to the cooling tower 136 is stopped during operation of the compressors, the discharge temperature, pressure, and flow rate of steam may rapidly change in each of the compressors 110a, 110b, 110c, and 110d, which may cause transition to the surge region of the compressors or the bumping phenomenon of distribution water.

Like the present embodiment, by stopping the compressors before stopping water distribution to the cooling tower 136, it is possible to avoid rapid change of the temperature, pressure, and flow rate of the compressed fluid during operation of the compressors, enabling highly reliable operation.

Each of the above-mentioned embodiments uses a plurality of compressors, and the cooling tower 36 and the cooling tower 136 are located between compressors. However, the present invention is not limited to a case when a plurality of compressors are used but applicable to a case when a single multi-stage compressor is used. When a multi-stage compressor is used, the same effect as shown in each embodiment can be obtained by preparing the cooling tower 36 and the cooling tower 136 between stages of the compressor.

What is claimed is:

1. A cooling apparatus which is located between a plurality of compression stages of a gas turbine compressor, the cooling apparatus comprising:
   an inlet into which a gas that has been compressed in the gas turbine compressor;
   a liquid distributor located above the inlet, the liquid distributor being a spray nozzle that sprinkles droplets having a diameter of 100 μm or more;
   a liquid passage restrainer located above the liquid distributor; and
   an output located above the liquid passage restrainer, wherein the gas that has flowed into the inlet is cooled by direct contact with a desired amount or more of a liquid sprinkled from the liquid distributor;
   wherein, for each droplet sprinkled from the liquid distributor, the liquid that is not completely evaporated remains and flows down into a reservoir; and
   wherein the cooled gas passes through the liquid passage restrainer and flows out from the outlet.

2. The cooling apparatus according to claim 1, wherein the liquid distributor sprinkles a desired amount or more of the droplets having a diameter of 100 μm or more.

3. The cooling apparatus according to claim 1, wherein
   a part of the sprinkled liquid is collected and the collected liquid can be redistributed.

4. The cooling apparatus according to claim 1, further comprising:
   a cooling mechanism for cooling the liquid before distribution of the liquid to the compressed gas.

* * * * *